(12) United States Patent
Spies et al.

(10) Patent No.: US 9,447,249 B2
(45) Date of Patent: Sep. 20, 2016

(54) POLYURETHANE-BASED EXPANDABLE POLYMER PARTICLES

(71) Applicant: BASF SE, Ludwigshafen (DE)

(72) Inventors: Patrick Spies, Neustadt (DE); Frank Braun, Ludwigshafen (DE); Carsten Schips, Biberach (DE); Frank Prissok, Lemförde (DE); Peter Gutmann, Karlsruhe (DE); Klaus Hahn, Kirchheim (DE); Bernhard Schmied, Frankenthal (DE)

(73) Assignee: BASF SE, Ludwigshafen (DE)

( * ) Notice: Subject to any disclaimer, the term of this patent is extended or adjusted under 35 U.S.C. 154(b) by 45 days.

(21) Appl. No.: 14/412,233

(22) PCT Filed: Jul. 5, 2013

(86) PCT No.: PCT/EP2013/064248
§ 371 (c)(1),
(2) Date: Dec. 31, 2014

(87) PCT Pub. No.: WO2014/006182
PCT Pub. Date: Jan. 9, 2014

(65) Prior Publication Data
US 2015/0344661 A1    Dec. 3, 2015

(30) Foreign Application Priority Data

Jul. 6, 2012   (EP) .................................. 12175270

(51) Int. Cl.
*C08J 9/12*     (2006.01)
*C08J 9/16*     (2006.01)
(Continued)

(52) U.S. Cl.
CPC .............. *C08J 9/20* (2013.01); *C08F 112/08* (2013.01); *C08F 283/006* (2013.01); *C08G 18/14* (2013.01); *C08G 18/4854* (2013.01);
(Continued)

(58) Field of Classification Search
None
See application file for complete search history.

(56) References Cited

U.S. PATENT DOCUMENTS

| 3,700,752 A | 10/1972 | Hutchinson |
| 2010/0222442 A1 | 9/2010 | Prissok et al. |
| 2012/0329892 A1* | 12/2012 | Prissok .............. C08G 18/4854 521/60 |

FOREIGN PATENT DOCUMENTS

| JP | 55080440 A | 6/1980 |
| JP | 2007231068 A | 9/2007 |

(Continued)

OTHER PUBLICATIONS

International Preliminary Report on Patentability for PCT/EP2013/064248 dated Jan. 15, 2015.

(Continued)

*Primary Examiner* — Kara Boyle
(74) *Attorney, Agent, or Firm* — Drinker Biddle & Reath LLP (57) ABSTRACT

Expandable-polymer-particle material comprising at least one thermoplastic polyurethane (TPU) with Vicat softening point (in accordance with ISO 306/ASO) below 80° C. and from 5 to 95% by weight of at least one polymer obtainable via free-radical polymerization, based on the entirety of TPU and of the polymer obtainable via free-radical polymerization, where the polymer obtainable via free-radical polymerization has been bonded to the TPU in a manner that gives a comb polymer, graft polymer, or copolymer, is suitable for the production of moldings, in particular for use as insulation material.

17 Claims, 3 Drawing Sheets

(51) Int. Cl.

| | | |
|---|---|---|
| *C08J 9/20* | (2006.01) | |
| *C08J 9/228* | (2006.01) | |
| *C08J 9/00* | (2006.01) | |
| *C08G 18/66* | (2006.01) | |
| *C08G 18/72* | (2006.01) | |
| *C08G 18/08* | (2006.01) | |
| *C08F 283/00* | (2006.01) | |
| *C08L 25/08* | (2006.01) | |
| *C08L 51/08* | (2006.01) | |
| *C08L 75/04* | (2006.01) | |
| *C08F 112/08* | (2006.01) | |
| *C08G 18/48* | (2006.01) | |
| *C08L 25/06* | (2006.01) | |
| *C08J 9/14* | (2006.01) | |

(52) U.S. Cl.
CPC ....... *C08G18/6607* (2013.01); *C08G 18/6674* (2013.01); *C08G 18/72* (2013.01); *C08J 9/0061* (2013.01); *C08J 9/141* (2013.01); *C08L 25/06* (2013.01); *C08L 25/08* (2013.01); *C08L 51/08* (2013.01); *C08L 75/04* (2013.01); *C08J 2201/026* (2013.01); *C08J 2203/14* (2013.01); *C08J 2325/06* (2013.01); *C08J 2351/08* (2013.01); *C08J 2375/08* (2013.01)

(56) References Cited

FOREIGN PATENT DOCUMENTS

| | | | |
|---|---|---|---|
| JP | 2007231068 A * | 9/2007 | |
| WO | WO-2007082838 A1 | 7/2007 | |
| WO | WO 2007082838 A1 * | 7/2007 | ......... C08G 18/4854 |
| WO | WO-2010010010 A1 | 1/2010 | |
| WO | WO 2010010010 A1 * | 1/2010 | ......... C08G 18/4238 |

OTHER PUBLICATIONS

International Search Report for PCT/EP2013/064248 mailed Sep. 12, 2013.

"Styrene modified thermoplastic polyruethane resin particles for foam molded product used for buildings, contains preset amount of polystyrene-type resin particles having preset length dispersed into thermoplastic polyrethane resin", Database WPI, XP002689499, Thomson Scientific, AN 2007-888076.

\* cited by examiner

POLYURETHANE-BASED EXPANDABLE POLYMER PARTICLES

CROSS-REFERENCE TO RELATED APPLICATIONS

This application is a national stage application (under 35 U.S.C. §371) of PCT/EP2013/064248, filed Jul. 5, 2013, which claims benefit of European Application No. 12175270.3, filed Jul. 6, 2012, both applications of which are incorporated herein by reference in their entirety.

The invention relates to expandable-polymer-particle material based on thermoplastic polyurethanes (TPUs) comprising a styrene polymer and TPU, to a process for the production thereof, to moldings obtainable from the polymer-particle material, and also to use thereof as elastomeric foam.

BACKGROUND OF THE INVENTION

Foams based on styrene polymers have been known for some time and are widely used by way of example for the production of insulation materials. Alongside the major advantages of these materials, for example in relation to insulation properties, low density, water resistance, and expandability, there are disadvantages in respect of chemicals resistance and impact resistance.

Thermoplastic polyurethanes in foamed form are also known. Examples of their features are excellent resilience, transparency, abrasion resistance, and chemicals resistance, but they have disadvantages such as inadequate dimensional stability and unsatisfactory foamability: it is technically very difficult to produce an expandable moldable foam from TPU, because physical blowing agents such as pentane are very rapidly lost into the environment from TPU via diffusion (poor blowing-agent retention capability). Physical blowing agents in straight TPU cannot moreover generate sufficient foaming pressure, and it is therefore not possible to use an EPS prefoamer for expansion of straight TPU comprising blowing agent.

Attempts have also been made to combine the advantageous properties of foams based on polystyrene and foams based on TPU.

The application WO 2007/082838 describes by way of example the production of expandable TPUs via compounding of TPU with a blowing agent in extrusion-based processes.

WO 2010/010010 describes thermoplastic polymer blends based on thermoplastic polyurethane and styrene polymer, foams produced therefrom, and associated production processes.

JP-A 1980-080440 describes a process for the production of expandable-polymer-particle material where from 20 to 80% by weight of TPU-elastomer-particle material and from 80 to 20% by weight of a monomer or methacrylate ester are suspended in an aqueous medium and polymerized.

JP-A 2007-231068 discloses styrene-modified expandable-TPU-particle material comprising 100 parts by weight of TPU and from 20 to 300 parts by weight of a styrene polymer, where styrene polymer particles of size 0.5 µm or less have been dispersed in the TPU.

Although good results are already being achieved with the known materials, there remains nevertheless much room for improvement, for example in relation to blowing-agent-retention capability combined with high resilience of these materials.

BRIEF DESCRIPTION OF THE FIGURES

FIG. 1 provides EFTEM (energy filtered transmission electron microscopy) images of expandable TPU-PS pellets (40:60) of the invention. FIG. 1a and 1b the contrasting agent is $RuO_4$, and in FIGS. 1c and 1d the contrasting agent is phosphotungstic acid.

DETAILED DESCRIPTION OF THE INVENTION

It was therefore an object to develop TPU-based materials which in particular can retain a physical blowing agent (pentane) over a period of weeks, can be processed in commercially available EPS machines, and nevertheless still have a sufficient level of elastomeric properties.

It has been found possible to produce polymers with the desired advantageous properties from TPU and from a polymer obtainable via free-radical polymerization, if the TPU used has a Vicat softening point below 80° C. (in accordance with ISO 306/A50) and the polymer obtainable via free-radical polymerization has been bonded in the form of comb polymer, graft polymer, or copolymer to the TPU.

The invention therefore provides expandable-polymer-particle material comprising at least one thermoplastic polyurethane (TPU) with Vicat softening point (in accordance with ISO 306/A50) below 80° C. and from 5 to 95% by weight, based on the entirety of TPU and of polymer obtainable via free-radical polymerization, of at least one polymer obtainable via free-radical polymerization, where the polymer obtainable via free-radical polymerization has been bonded to the TPU in a manner that gives a comb polymer, graft polymer, or copolymer.

The invention further provides expanded-polymer-particle material of the invention, obtainable via prefoaming of the polymer-particle material of the invention.

The invention also provides foam moldings obtainable from the prefoamed polymer-particle material of the invention.

The invention further provides a process for the production of the polymer-particle material of the invention, comprising the following steps:

a) dispersion of one or more TPUs with Vicat softening point below 80° C., from 5 to 95% by weight of one or more monomers polymerizable by a free-radical route and optionally comonomers, based on the entirety of TPU and of the monomers mentioned, of a polymerization initiator, of a dispersing agent, and optionally of other additional substances and/or polymerization aids in an aqueous medium at a temperature at which no substantial polymerization of the styrene monomers takes place;

b) optional stirring of the resultant dispersion for from one to 24 h at a temperature at which no substantial polymerization of the monomers polymerizable by a free-radical route takes place;

c) polymerization of the monomers polymerizable by a free-radical route in the form of a comb polymer, graft polymer or copolymer onto the TPU, and d) addition of a physical blowing agent to the aqueous suspension.

The invention also provides the use of the foam moldings of the invention as elastomeric foam, preferably as insulation material for facades, interiors of residential buildings, and/or solid-borne-sound-deadening, for sports floors, shoe soles, and/or bumpers for automobiles.

Thermoplastic polyurethanes (TPUs) and process for production thereof are known.

The invention uses TPU grades with Vicat softening point below 80° C., preferably from 60 to 79° C., particularly preferably from 60 to 75° C.

Vicat softening point is determined here in accordance with ISO 306 by the ASO method, i.e. using a force of 10 N and a heating rate of 50° C./h.

Vicat softening point is determined on specimens which are free from blowing agent and which comprise none of the additives conventionally used for the desired applications.

A Vicat softening point of the invention can be achieved by methods known to the person skilled in the art, for example via use of appropriate monomer units in the production of the TPU (see below).

The Shore A hardness of TPU grades used in the invention is preferably in the range from 50 to 150, particularly preferably from 65 to 85 (measured in accordance with DIN 53505).

The melting range (glass transition) is preferably in the range from −20° C. to −60° C.

Elongation at break in accordance with DIN 53504-S2 is preferably >550%.

In another feature essential to the invention, alongside the stated Vicat softening point, TPUs used in the invention must comprise functional groups which, under the typical conditions of free-radical polymerization of, for example, styrene (T=from 100-140° C.; from 0.1-3% by weight of peroxide initiator, such as dicumyl peroxide) form a comb polymer, graft polymer, or copolymer with the monomers capable of free-radical polymerization. A first variant achieves this via use of a di- or monoisocyanate component having hydrogen atoms that are extractable by a free-radical route, an example being diphenylmethane 4,4'-, 2,4'-, and/or 2,2'-diisocyanate (MDI). or else a mixture of these, during the production of the TPUs in a manner (see below) that is in principle known.

In a second variant, monomers that are capable of free-radical polymerization and that have groups (alcohol groups, epoxy groups, amine groups) which can enter into a polyaddition reaction with isocyanates are added during the production of the TPUs in a known manner (see below). Particular preference is given here to the following compounds as monomers: hydroxyethyl methacrylate; 1,2- and 1,3-dihydroxypropyl methacrylate; glycidyl methacrylate, ortho-, meta-, and para-hydroxystyrene, meta- and para-aminostyrene, methacrylamide, 1,4-butenediol, 1,4-butynediol, and/or polybutadienediol.

TPUs and processes for production thereof have been widely described, for example in Gerhard W. Becker and Dietrich Braun, Kunststoff Handbuch, Band 7 "Polyurethane" [Plastics handbook, volume 7, "Polyurethanes"], Carl Hanser Verlag, Munich, Vienna, 1993.

All molar masses in this specification stated in [kg/mol] are the number-average molar mass.

Preferred embodiments produce TPU via reaction from a mixture of isocyanates (a) with compounds (b) which are reactive toward isocyanates and which preferably have a molar mass of from 0.5 kg/mol to 10 kg/mol, and optionally with chain extenders (c) which preferably have a molar mass of from 0.05 kg/mol to 0.5 kg/mol.

In other preferred embodiments, at least one chain regulator (c1), one catalyst (d), and optionally at least one filler, auxiliary, and/or additional substance is also added to the mixture for the production of TPU. The substance groups designated by small letters, sometimes also by numerals, are also termed components.

The components (a), (b), (c), (c1), (d), and (e) usually used in the production of the TPUs are described by way of example hereinafter, and comprise the following substance groups: isocyanates (a), compounds (b) reactive toward isocyanates, chain extenders (c), chain regulators (c1), catalysts (d), and/or at least one conventional filler, auxiliary, and/or additional substance.

In all cases, production of TPUs requires a mixture of isocyanates (a) and compounds (b) reactive toward isocyanates. The further addition of components (c), (c1), (d), and (e) is optional, and can be implemented singly or in any of the possible variations. The term component here in each case means an individual substance or a mixture of the substances of that component.

The term structural components is used for the following components: isocyanates (a), compounds (b) reactive toward isocyanates, and chain extenders (c) and, if used, also the chain regulators (c1).

Preferred embodiments use, as organic isocyanates (a), aliphatic, cycloaliphatic, araliphatic, and/or aromatic isocyanates, and more preferably diisocyanates. Examples of preferred diisocyanates are tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'-, and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and phenylene diisocyanate.

Particular preference is given to diphenylmethane 4,4'-, 2,4'-, and 2,2'-diisocyanate (MDI), and also to mixtures of these. Subordinate amounts, e.g. amounts of up to 3 mol %, preferably of up to 1 mol %, based on the organic diisocyanate, of a polyisocyanate of functionality three or higher can optionally replace the organic diisocyanates, but the amount of this replacement must be restricted so that polyurethanes obtained are still thermoplastically processable. A relatively large amount of these more than difunctional isocyanates is advantageously compensated by concomitant use of less than difunctional compounds having reactive hydrogen atoms, in order to avoid any excessive chemical crosslinking of the polyurethane.

In preferred embodiments, compounds (b) used that are reactive toward isocyanates are polyetherols, polyesterols, and/or polycarbonatediols, another collective term usually used for these being "polyols".

TPU is preferably produced from polyether alcohol, and it is particularly preferable to use polyetherdiol.

Suitable polyetherdiols can be produced by known processes, for example via anionic polymerization of alkylene oxides with alkali metal hydroxides, such as sodium hydroxide or potassium hydroxide, or with alkali metal alcoholates, such as sodium methoxide, sodium ethoxide, or potassium ethoxide, or potassium isopropoxide, as catalysts, and with addition of at least one starter molecule which comprises from 2 to 3, preferably 2, reactive hydrogen atoms in bonded form, or via cationic polymerization with Lewis acids as catalysts from one or more alkylene oxides having from 2 to 4 carbon atoms in the alkylene moiety. Examples of suitable alkylene oxides are tetrahydrofuran, propylene 1,3-oxide, and particularly preferably ethylene oxide and propylene 1,2-oxide. The alkylene oxides can be used individually, in alternating succession, or in the form of mixtures. Examples of starter molecules that can be used are: water, organic dicarboxylic acids, such as succinic acid and adipic acid, and preferably dihydric alcohols optionally comprising ether bridges in bonded form, e.g. ethanediol, 1,2-propanediol, 1,4-butanediol, diethylene glycol, 1,6-hexanediol, and 2-methyl-1,5-pentanediol. The starter molecules can be used individually or in the form of mixtures. The polytetrahydrofurans (PTHFs) comprising hydroxy groups are in particular suitable and preferred.

The average molecular weights of the polyetherols, where these are in essence linear, are usually from 500 to 8000, preferably from 600 to 6000, and the preferred average molecular weight of the PTHF here is from 500 to 2500, in particular from 800 to 2000. The materials here can be used either individually or else in the form of mixtures with one another.

A particularly preferred polyetherdiol is polytetrahydrofuran. It is preferable that the molar masses of the polyether alcohols and polytetrahydrofuran used are from 0.6 kg/mol to 2.5 kg/mol. The polyether alcohols are used individually or else in the form of a mixture of various polyether alcohols.

In alternative embodiments, TPU is produced from polyester alcohol. In one preferred embodiment, polyesterdiol is used for this purpose. A preferred polyesterdiol is produced from adipic acid and 1,4-butanediol. Preferred embodiments of the polyester alcohols have a molar mass of from 0.6 kg/mol to 2.5 kg/mol.

In embodiments to which further preference is given, said polyols have molar masses of from 0.5 kg/mol to 8 kg/mol, preferably from 0.6 kg/mol to 6 kg/mol, in particular from 0.8 kg/mol to 4 kg/mol, and in embodiments to which further preference is given they have an average functionality of from 1.8 to 2.3, more preferably from 1.9 to 2.2, in particular 2. In one particularly preferred embodiment, the polyol is a polyester alcohol, preferably synthesized from polytetrahydrofuran, and in an embodiment to which further preference is given its molar mass is from 0.6 kg/mol to 2.5 kg/mol.

In preferred embodiments, chain extenders (c) used comprise aliphatic, araliphatic, aromatic and/or cycloaliphatic compounds, and in embodiments to which further preference is given the molar mass of these is from 0.05 kg/mol to 0.5 kg/mol. In some preferred embodiments, chain extenders (c) are compounds having two functional groups, for example diamines and/or alkanediols having from 2 to 10 carbon atoms in the alkylene moiety, in particular 1,4-butanediol, 1,6-hexanediol, and/or di-, tri-, tetra-, penta-, hexa-, hepta-, octa-, nona-, and/or decaalkylene glycols having from 3 to 8 carbon atoms, and corresponding oligo- and/or polypropylene glycols. In other embodiments, mixtures of the chain extenders are used for the production of TPU.

In some embodiments, chain regulators (c1) are used, usually with a molar mass of from 0.03 kg/mol to 0.5 kg/mol. Chain regulators are compounds which have only one functional group with regard to isocyanates. Examples of chain regulators are monohydric alcohols, monofunctional amines, preferably methylamine, and/or monohydric polyols. Chain regulators can be used for controlled adjustment of the flow behavior of the mixtures of the individual components. In preferred embodiments, the amount used of chain regulators is from 0 parts by weight to 5 parts by weight, more preferably from 0.1 part by weight to 1 part by weight, based on 100 parts by weight of the compound b) reactive toward isocyanates. Chain regulators are used to supplement chain extenders or in place thereof.

In other embodiments, the TPU production process uses at least one catalyst (d) which in particular accelerates the reaction between the NCO groups of the diisocyanates (a) and the compounds reactive toward isocyanates, preferably hydroxy groups of structural components (b), (c), and (c1). In preferred embodiments, the catalyst is one selected from the group of the tertiary amines, such as triethylamine, dimethylcyclohexylamine, N-methylmorpholine, N,N'-dimethylpiperazine, 2-(dimethylaminoethoxy)ethanol, diazabicyclo[2.2.2]octane, and similar substances. In embodiments to which further preference is given, the at least one catalyst is one selected from the group of the organometallic compounds and by way of example is titanic ester, an iron compound, such as iron(III) acetylacetonate, a tin compound, such as tin diacetate, tin dioctanoate, tin dilaurate, or a dialkyltin salt of an aliphatic carboxylic acid, e.g. dibutyltin diacetate, dibutyltin dilaurate, or the like.

In some embodiments, the catalysts are used individually, and in other embodiments mixtures of catalysts are used. In preferred embodiments, the amounts used of the catalyst or of the mixture of catalysts are from 0.0001 part by weight to 0.1 part by weight per 100 parts by weight of the compound (b) reactive toward isocyanates, preferably polyhydroxy compound.

Examples that may be mentioned of auxiliary and/or additive (e) are hydrolysis stabilizers and flame retardants. Other additives and auxiliaries can be found in standard works, such as the Becker and Braun (1996) work mentioned above.

Other substances that can be added to structural components (a) to (c), and optionally (c1), alongside catalysts (d), or else without the use of catalysts, are hydrolysis stabilizers, such as polymeric and low-molecular-weight carbodiimides.

The molar ratios of structural components (b) and (c) can be varied relatively widely in order to adjust the Shore hardness of TPU. In preferred embodiments, the molar ratio of component (b) to the entire amount of chain extenders (c) used is from 10:1 to 1:10, preferably from 5:1 to 1:8, more preferably from 1:1 to 1:4, where the hardness of TPU rises with increasing content of chain extender (c). This method permits adjustment to Shore hardness values of from A44 to D80, particularly preferred Shore hardness values being from A44 to A84. The Shore hardness values are determined in accordance with DIN 53505.

In embodiments to which further preference is given, the reaction to give TPU takes place with customary indices. The index is defined via the ratio of the entirety of isocyanate groups used during the reaction in component (a) to the groups reactive toward isocyanates, i.e. the active hydrogen atoms, in components (b) and (c). If the index is 100, there is one active hydrogen atom, i.e. one function reactive toward isocyanates, in components (b) and (c) for each isocyanate group in component (a). If indices are above 100, there are more isocyanate groups present than groups reactive toward isocyanates, for example OH groups.

In particularly preferred embodiments, the reaction to give TPU takes place with an index of from 60 to 120, more preferably with an index of from 80 to 110.

The production of TPU is preferably carried out by one of the known processes addressed below. Preferred embodiments are the continuous process, for example using reaction extruders, the belt process, the "one-shot" process, or the prepolymer process. The batch process and the prepolymer process are embodiments to which preference is equally given. In these processes, reactive components (a) and (b), and also optionally (c), (c1), (d), and/or (e) can be mixed with one another in succession or simultaneously, whereupon the reaction of components (a) and (b) immediately begins.

In the extruder process, structural components (a) and (b), and also optionally components (c), (c1), (d), and/or (e) are introduced individually or in the form of a mixture into the extruder and by way of example are reacted at temperatures of from 100° C. to 280° C., preferably from 140° C. to 250° C. The resultant TPU is extruded, cooled, and pelletized. It can sometimes be advantageous to condition the resultant TPU prior to further processing at from 80° C. to 120° C., preferably at from 100° C. to 110° C., for a period of from 1 to 24 hours, i.e. to permit the mixture to continue reacting at constant temperature.

Preferred types of TPU have a relatively large content of the soft phase in comparison with the hard phase, preferred amounts of soft phase being from 5 to 30% by weight, particularly preferably from 10 to 25% by weight. It is moreover preferable that the nitrogen content of the hard phase is relatively high.

Examples of preferred types of TPU are available commercially as Elastollan®1170 AU, Elastollan®1180, Elastollan® 1175 A 10W000, and Elastollan®880 A 13N000 from BASF Polyurethan GmbH, Lemförde, Germany.

Particular preference is given to Elastollan® 1170 AU, a TPU that is obtainable from polytetrahydrofuran 1000 and 2000 (where the numerals relate to the molecular weight $M_w$, and the products are by way of example available commercially from BASF SE), and from a small proportion of 1,4-butanediol and diphenylmethane 4,4'-diisocyanate (MDI).

The polymer-particle material of the invention comprises, alongside the TPU, from 5 to 95% by weight (based on the entirety of TPU and styrene polymers) of one or more polymers obtainable via free-radical polymerization and bonded in the form of comb polymer, graft polymer, or copolymer to the TPU. It is preferable that the proportion of these is from 80 to 30%, particularly preferably from 75 to 50%, very particularly preferably from 75 to 65%.

Preferred polymers obtainable via free-radical polymerization used are polymers based on monomers having vinylic unsaturation, for example (and preferably) styrene, acrylates, and methacrylates, vinyl chloride, vinyl acetate, acrylonitrile, and mixtures thereof.

Styrene polymers are preferred.

The expression styrene polymer in the invention comprises polymers based on styrene, or alpha-methylstyrene, or on a mixture of styrene and alpha-methylstyrene. Styrene polymers of the invention are based on at least 50% by weight of styrene and/or alpha-methylstyrene monomers.

Preferred styrene polymers are polystyrene, poly-alpha-methylstyrene, and styrene-alpha-methylstyrene copolymers, and others that can be used are styrene-butadiene copolymers (SB), styrene-acrylonitrile copolymers (SAN), acrylonitrile-alpha-methylstyrene copolymers (AMSAN), styrene-maleic anhydride copolymers (SMA), styrene-methyl methacrylate copolymers (SMMA), styrene-N-phenylmaleimide copolymers (SPMI), acrylonitrile-styrene-acrylate (ASA), methyl methacrylate-butadiene-styrene (MBS), and methyl methacrylate-acrylonitrile-butadiene-styrene (MABS) polymers, and mixtures thereof. Particular preference is given to polystyrene, i.e. the use of styrene monomers.

Figures 1, 1A:
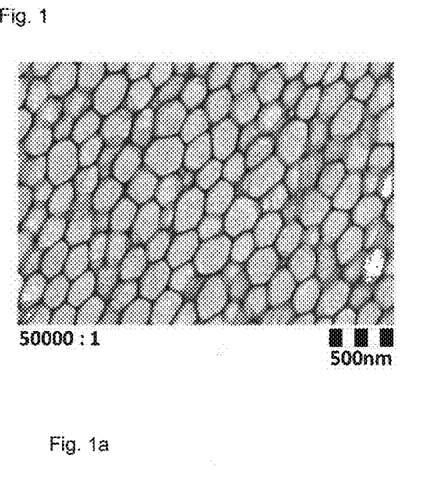
Figure 1B:
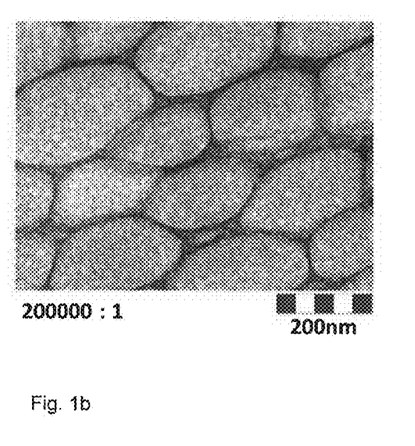
Figure 1C:
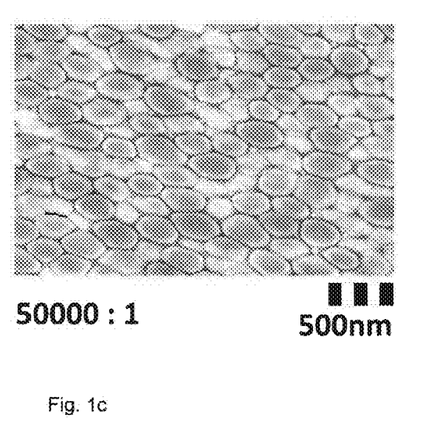
Figure 1D:
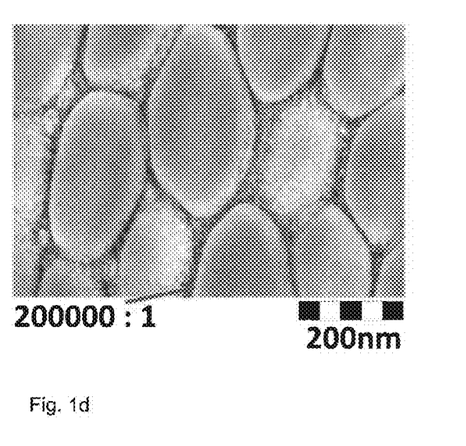

The polymer-particle material of the invention features a particular TPU phase morphology, which is composed of a continuous phase made of TPU homopolymer and of a discontinuous phase made of the graft polymer of TPU and of the polymer obtainable via free-radical polymerization. The TPU phase here ideally has a phase morphology as shown in FIG. 1 (TEM image). The graft polymer made of TPU and of the polymer obtainable via free-radical polymerization here forms round to elliptical discontinuous phases with a diameter of from 50 to 500 nm. Surrounding these there is a coherent continuous TPU network. FIG. 1 provides EFTEM (energy filtered transmission electron microscopy) images of expandable TPU-PS pellets (40:60) with good blowing-agent-retention capability. In FIGS. 1 and 1b the contrasting agent is $RuO_4$, and in FIGS. 1c and 1d it is phosphotungstic acid.

Figure 2:
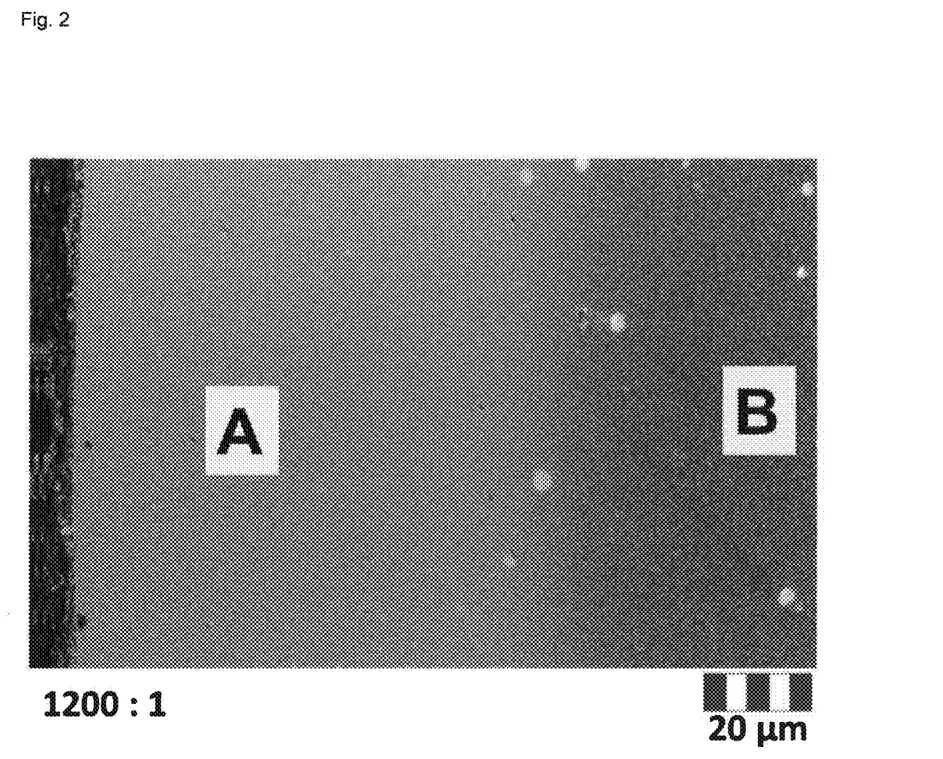
FIG. 2 shows SEM images of expandable TPU-PS pellets (50:60) of the invention.

By way of example, expandable bead polymers having from 50-70% polystyrene content have a marginal zone with a diameter of from 10-100 μm composed of straight TPU (see FIG. 2). This marginal zone provides a particular surface (with the good grip of straight TPU) to the foams produced from the polymer, and the resultant foams therefore have a very high-quality appearance. FIG. 2 shows SEM images of expandable TPU-PS pellets (50:60) with good blowing-agent-retention capability: the specimens were cryosectioned, contrasted with $RuO_4$, and then viewed by SEM, which was used to obtain images of examples (marginal zone A; bead center B) of locations. Straight TPU appears paler than styrene-modified TPU in the SEM images.

An essential element of the invention is that the polymer structure described above can be obtained under suitable conditions via free-radical polymerization of one or more monomers in the TPU network swollen by said monomer(s).

In order to improve mechanical properties or resistance to temperature change, compatibilizers can optionally be used to blend the polymer-particle material of the invention with thermoplastic polymers such as polyamides (PA), polyolefins such as polypropylene (PP) or polyethylene (PE), polyacrylates such as polymethyl methacrylate (PMMA), polycarbonates (PC), polyesters such as polyethylene terephthalate (PET) or polybutylene terephthalate (PBT), polyether sulfones (PES), polyether ketones, or polyether sulfides (PES), or a mixture thereof, in proportions which are in total up to at most 30% by weight, preferably in the range from 1 to 10% by weight, based on the polymer content. Mixtures in the ranges of amounts mentioned are also moreover possible with, for example, hydrophobically modified or functionalized polymers or oligomers, rubbers such as polyacrylates or polydienes, for example styrene-butadiene block copolymers, or biodegradable aliphatic or aliphatic/aromatic copolyesters.

The polymer pellets of the invention comprise a blowing agent component. The blowing agent component comprises one or more blowing agents in a proportion of in total from 1 to 15% by weight, preferably from 2 to 6% by weight, particularly preferably from 3 to 5% by weight, based on. Examples of suitable blowing agents are aliphatic hydrocarbons having from 2 to 8, preferably from 3 to 8 carbon atoms, and mixtures of 2 or more of these hydrocarbons and/or 2 or more isomers of these hydrocarbons. Preference is given to butane isomers and pentane isomers, for example isobutane, n-butane, isopentane, n-pentane, and mixtures of these, in particular pentaneisomers, for example isopentane and n-pentane, and mixtures of these isomers. The following are in particular suitable as co-blowing agents, preferably in a proportion from 0 to 3% by weight, preferably from 0.25 to 2.5% by weight, in particular from 0.5 to 2.0% by weight (based on (P)): ($C_1$-$C_4$)-carbonyl compounds, for example ketones and esters, $C_1$-$C_4$-alcohols, and $C_2$-$C_4$-ethers. Preferred co-blowing agents are ketones, particularly acetone.

The stated amounts of blowing agents are the amounts added during the production process. The content in the product and in particular after storage is correspondingly lower.

The bulk density of the expanded polymer pellets of the invention is generally at most 300 g/l, preferably from 15 to 200 g/l, particularly preferably in the range from 40 to 150 g/l. When fillers are used, bulk densities in the range from 40 to 150 g/l can arise, depending on the nature and amount of the filler.

The polymer-particle material of the invention preferably comprises, alongside polymer component and blowing agent component, an additive component. Suitable additives are known to the person skilled in the art.

In one preferred embodiment, at least one nucleating agent is added to the polymer component (P), Examples of nucleating agents that can be used are amounts which are generally from 0.1 to 10% by weight, preferably from 0.1 to 3% by weight, particularly preferably from 0.1 to 1.5% by weight, based on (P), of fine-particle, inorganic solids such as talc powder, silicon dioxide, mica, clay, zeolites, calcium carbonate, and/or polyethylene waxes. The average particle diameter of the nucleating agent is generally in the range from 0.01 to 100 μm, preferably from 1 to 60 μm. A particularly preferred nucleating agent is talc powder, for example talc powder from Luzenac Pharma. The nucleating agent can be added by methods known to the person skilled in the art.

Other additives can be added if desired, examples being fillers (such as mineral fillers, e.g. glass fibers), plasticizers, flame retardants, IR absorbers, and athermanous materials, such as carbon black, coke, graphene, and/or graphite, aluminum powder, and titanium dioxide, soluble and insoluble dyes, pigments, UV stabilizers, and/or heat stabilizers.

It is very particularly preferable to add amounts which are generally from 0.05 to 25% by weight, in particular amounts of from 2 to 8% by weight, based on (P), of graphite. Suitable particle sizes for the graphite used are in the range from 1 to 50 μm, preferably in the range from 2 to 10 μm.

The use of UV stabilizers has proven advantageous. Specifically in the case of the polymers PS1) such as SMA, strong UV irradiation leads to visible yellowing and to chemical changes in the material which are attended by significant embrittlement. Reactivity, e.g. with SMA, is an important factor for the selection of suitable UV stabilizers. While stabilizers based on benzotriazoles such as Tinuvin 234 can improve UV resistance without altering processing properties and foam properties, stabilizers based on sterically hindered amines, for example Uvinul 4050 and Tinuvin 770, are less suitable for the system of materials of the invention.

It is preferable that the pellets of the invention comprise, as additive, a UV stabilizer based on amounts in the range from 0.05 to 5 parts by weight, preferably from 0.1 to 1 part by weight, based on 100 parts by weight of polymer P, of benzotriazoles.

Because various industries apply fire-protection regulations, it is preferable to add one or more flame retardants. Examples of suitable flame retardants are tetrabromobisphenol A, brominated polystyrene oligomers, brominated butadiene-polystyrene copolymers in accordance with WO 2007/058736, tetrabromobisphenol A diallyl ether, and hexabromocyclododecane (HBCD), in particular the industrial products, where these in essence comprise the α-, β-, and γ-isomer with added synergists, such as dicumyl. Preference is given to brominated aromatics, such as tetrabromobisphenol A, and to brominated styrene oligomers. Examples of suitable halogen-free flame retardants are expandable graphite, red phosphorus, and phosphorus compounds, such as expandable graphite, red phosphorus, triphenyl phosphate, and 9,10-dihydro-9-oxa-10-phosphaphenanthrene 10-oxide.

Preferred phosphorus compounds are tris(2-chloroisopropyl) phosphate, triethyl phosphate, diethyl ethylphosphonate, cresyl diphenyl phosphate, Exolit OP560, diphenyl 6-(diphenoxyphosphoryloxy)hexahydrofuro[3,2-b]furan-3-yl phosphate, 9,10-dihydro-9-oxa-10-phosphaphenanthrene 10-oxide, and 6H-dibenzo[c,e][1,2]oxaphosphorine 6-oxide.

Preference is moreover given to organic peroxides (dicumyl peroxide), sulfur, and disulfides as synergists. The abovementioned flame retardants can either be dissolved in the monomers before the polymerization reaction starts or incorporated in the TPU by extrusion.

In one preferred embodiment, the polymer-particle material of the invention has a coating of one or more coating components, where said coating components can optionally have been adsorbed onto a porous solid.

Examples of suitable coating components are glycerol ester, zinc stearate, citric ester, and in particular fine-particle silicates.

Particular preference is given to the corresponding commercially available products, which are generally mixtures of the corresponding mono-, di-, and triesters, which also can comprise small proportions of free glycerol and of free fatty acids, examples being glycerol tristearates and glycerol monostearates.

It has proven particularly preferable to coat the polymer with from 0.1 to 1% by weight of hydrophilic silica (e.g. Sipernat® FK320; Evonik).

Other possible coating materials are plasticizers from the group consisting of a) one or more alkyl esters of cyclohexanecarboxylic acids with boiling point ≥160° C., b) one or more phenyl $C_{10}$-$C_{21}$-alkanesulfonates with boiling point ≥150° C., and c) mixtures of components a) and b).

Preference is given to the mono-, di-, and triglycerides which are obtainable from glycerol and stearic acid, glycerol and 12-hydroxystearic acid, and glycerol and ricinoleic acid, and also to mixed di- and triglycerides which are obtainable from one or two fatty acids from the group of oleic acid, linoleic acid, linolenic acid, and palmitic acid, alongside stearic acid, 12-hydroxystearic acid, and ricinoleic acid.

The total amount of additives is generally from 0 to 5% by weight, preferably from 0 to 0.5% by weight, based on the total weight of the polymers used.

The polymer-particle material of the invention is obtainable via a process for the production of expandable-polymer-particle material, comprising the following steps:
a) dispersion of one or more TPUs with Vicat softening point below 80° C., from 5 to 95% by weight of one or more monomers polymerizable by a free-radical route and optionally comonomers, based on the entirety of TPU and of the monomers mentioned, of a polymerization initiator, of a dispersing agent, and optionally of other additional substances and/or polymerization aids in an aqueous medium at a temperature at which no substantial polymerization of the monomers polymerizable by a free-radical route takes place;

b) optional stirring of the resultant dispersion for from one to 24 h at a temperature at which no substantial polymerization of the monomers polymerizable by a free-radical route takes place,
c) polymerization of the monomers polymerizable by a free-radical route in the form of a comb polymer, graft polymer or copolymer onto the TPU, and
d) addition of a physical blowing agent to the aqueous suspension.

For the suspension polymerization process of the invention it is preferable in accordance with what has been said above to use styrene alone. It is also possible as an alternative to use other monomers capable of free-radical polymerization, for example alkylstyrenes, divinylbenzene, 1,4-butanediol dimethacrylate, acrylonitrile, diphenyl ether, or α-methylstyrene and acrylates.

During the suspension polymerization process it is possible to add, alongside the blowing agents, the usual auxiliaries, such as peroxide initiators, suspension stabilizers, blowing agents, chain-transfer agents, expansion aid, nucleating agents, and plasticizers.

The auxiliaries and additional substances mentioned can moreover be added to the suspension. Amounts of from 3 to 15% by weight, based on the entirety of monomer and TPU added. They can be added prior to, during or after the polymerization of the suspension.

It is advantageous to use, as suspension stabilizers, inorganic Pickering dispersants, e.g. magnesium pyrophosphate or calcium phosphate.

Before the TPU used is used in the polymerization it can be processed via underwater pelletization to give mini pellets of average diameter from 0.5 to 1,5 mm. The product obtained after the polymerization reaction therefore has a particle size that can be processed in conventional EPS machines. Amounts of from 0.01 to 15% by weight of nucleating agents, such as talc powder or polyethylene waxes, can moreover be incorporated by means of extrusion into the polyurethane used.

One preferred embodiment of the process begins by using, as initial charge, an aqueous phase which comprises from 0.1 to 10% by weight of the abovementioned Pickering stabilizers, from 0.1 to 0.001% by weight of a surfactant (for example sodium dodecylsulfonate), and from 1 to 90% by weight of TPU pellets in a stirrable pressure autoclave.

The monomer, which optionally comprises the abovementioned auxiliaries, such as initiators and flame retardants, is metered at room temperature, or below the polymerization temperature, into the stirred reactor. One variation of the process begins by combining the TPU at room temperature with the monomer, which comprises the abovementioned auxiliaries, such as initiators and optionally flame retardants, in the absence of water, and allowing the material to swell for from 0.5 to 24 hours. The pellets swollen by monomer are then likewise transferred to the polymerization reactor, which contains the aqueous phase with the abovementioned Pickering stabilizer and with the surfactant.

It has proven advantageous to stir the reaction mixture for a certain time (about 1 to 5 hours) at an elevated temperature below the polymerization temperature (preferably from 10 to 60° C., for example at 50° C.), in order to promote swelling of the TPU pellets by the monomer mixture. The reaction mixture is then heated to the polymerization temperature. Surprisingly, it has been found that increased formation of the copolymer described above, made of TPU and polystyrene, occurs at a preferred polymerization temperature of from 110 to 140° C. (use of a peroxide initiator with T1/2=1 h at from 120 to 135° C.).

The suspension polymerization reaction produces particles which are bead-shaped and in essence round, with average diameter in the range from 0.5 to 4 mm if micropelletized TPU has been used, or particles of size from 0.5 to 2 cm if no micropelletization of the TPU has been carried out. They can be coated with the conventional coating agents, e.g. metal stearates, glycerol esters, and fine-particle silicates. It has proven particularly useful here to coat the polymer with from 0.1 to 1% by weight of hydrophilic silica (Sipernat® FK320; Evonik).

The expandable-polymer-particle material can be processed to give foams with densities of from 20 to 250 g/l, preferably from 50 to 100 g/l. For this, the preferred expandable-particle material is prefoamed with steam (e.g. standard EPS prefoamer from Hirsch). The resultant prefoamed particle material is preferably placed into storage for from 10 to 24 hours and then is preferably processed in a standard EPS machine to give blocks or moldings.

For applications requiring high resilience with good recovery capability (floorcoverings, solid-borne-sound-deadening), the resultant blocks or moldings can be elastified by applying and removing load in mechanical presses. Unidirectional elastification of the material has proven to be advantageous here for these types of applications. In the elastification process, a foam product (block or molding) is compressed in a press to from 10 to 50% of its initial volume. Once the compression process has ended, the compressed molding is placed into storage (for up to 24 h) and is then appropriately cut to side. The elastified materials have extremely high undirectional recovery capability.

The examples provide further explanation of the invention.

EXAMPLES

Precipitation of Magnesium Pyrophosphate (MPP)

An amorphous MPP precipitate was used as Pickering stabilizer in all of the examples described. A decisive factor is that the MPP precipitate used has been freshly prepared (at most 12 hours old), since otherwise it is impossible to achieve adequate stabilization of the reaction mixtures. The MPP precipitate can be used as follows:

931.8 g of sodium pyrophosphate (Giulini) are dissolved in 32 l of water at room temperature (25° C.). A solution of 1728 g of magnesium sulfate heptahydrate (Epsom salt) is added, with stirring, to this solution, and stirring is then continued for a further 5 minutes. This gives a white suspension which settles after a few minutes. In the examples described, the abovementioned suspension is used directly after brief mixing/shaking.

TPU Pellets:

Commercially available polyether-based TPU is used (Elastollan® 1170AU, Elastollan® 1180A from BASF Polyurethanes GmbH). In order to obtain expandable polymer pellets with a particle size typical of EPS (from 0.5 to 4 mm), it has proven advantageous to use an extruder and underwater pelletizer to convert the TPU into micropellets of particle size from 0.5 to 2 mm.

It has moreover proven advantageous to incorporate from 0.1 to 1% by weight of talc powder (Microtalc IT extra, Mondo Minerals) during micropelletization. This ensures that a more homogeneous foam structure is subsequently obtained (nucleating agent).

Inventive Example 1

1.1 Swelling 3.00 kg of styrene in which 21.0 g of dicumyl peroxide (Perkadox® BC-FF, AkzoNobel) had been dissolved were used as initial charge in a 5 l stainless steel can (milk churn). 350 g of TPU minipellets comprising 0.5% by weight of talc powder, Elastollan® 1170AU, were suspended in a sieve insert in the styrene solution for 4 hours. The sieve insert was then removed from the styrene-peroxide solution, and the swollen material was allowed to drip dry for 5 minutes. The mass of the swollen TPU pellets after drip-drying was 965 g, and they were stored overnight (for about 10 h) in a PE canister.

1.2 Polymerization

The swollen TPU was transferred to a 6 l pressure autoclave [EPS reactor, maximum pressure: 20 bar, blade stirrer; stirrer rotation rate 300 rpm] containing 3 kg of deionized water, 803 g of MPP precipitate, and 42 g of 2% solution of E30 emulsifier (produced from E30-40 Leuna Tenside GmbH). Once the reactor had been sealed and nitrogen had been introduced (inertization) the system was heated within 1.5 hours to 125° C. One hour after 125° C. had been reached, 80 g of isopentane were metered into the reactor within 40 minutes. The system was kept at a temperature of 125° C. for a further 6.5 hours, and then cooled to room temperature. The resultant polymer beads comprising blowing agent were isolated by decanting, dried to remove inernal water, and coated with 0.3% by weight of precipitated silica (Sipernat FK320, Evonik). For equilibration purposes, the material was placed into storage in a pressuretight container (zinc box) for at least 2 to 5 days.

Values determined on the resultant polymer after 5 days of storage in a gastight container (zinc box) were: water (Fischer titration) and volatiles content (gravimetric after 2 h at 120° C.):

water content: 0.45%
volatiles content at 120° C., dried for 2 h: 4.52%.

The nitrogen content of the polymer was determined (nitrogen determination by Kjeldahl method). The TPU content of the polymer was calculated by comparison with the TPU used

| Nitrogen analysis | | TPU content |
|---|---|---|
| Polymer | 0.92% | 33% |
| TPU reference | 2.8% | 100% |

In order to assess expandability, foaming curves were generated in a steam prefoamer at atmospheric pressure (Rauscher box, T=from 98-102° C.) after 5 days of storage in a gastight container (zinc box). The bulk density of the prefoamed material was measured after a defined prefoaming time.

After 5 days of storage in a gastight zinc box, the coated polymer was prefoamed in a standard EPS prefoamer to a density of 50 g/l (steam pressure 0.2 bar).

Figure 3:
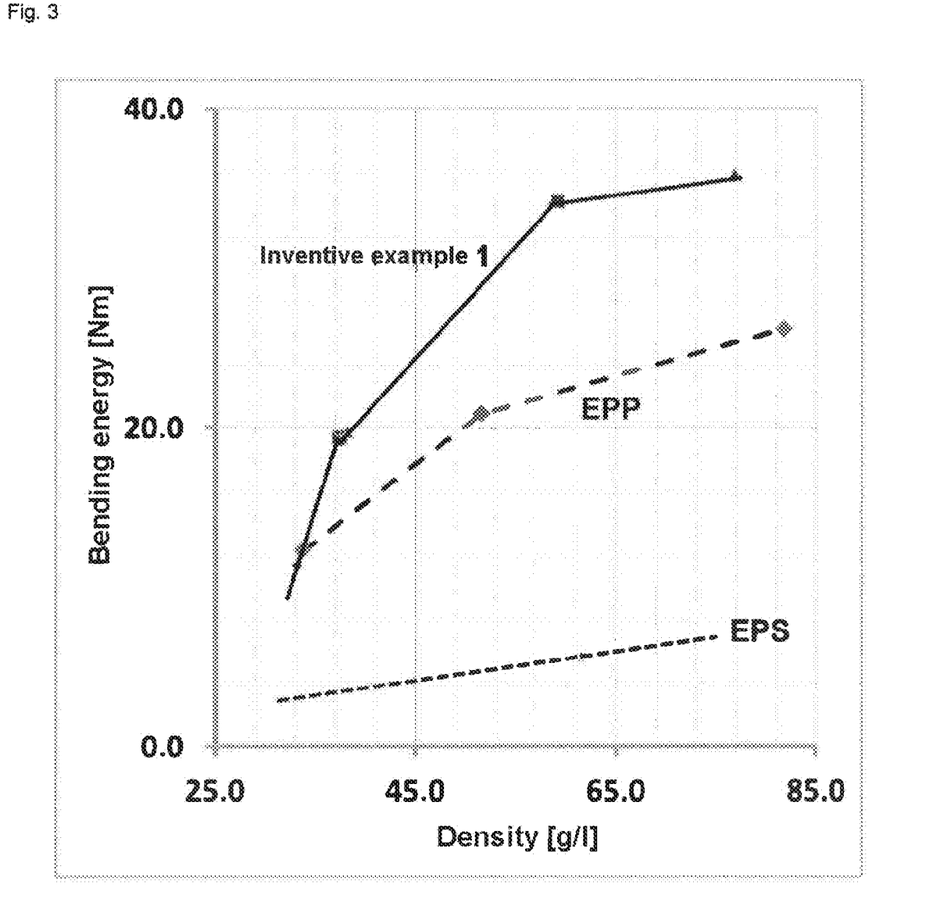
FIG. 3 is a bending energy diagram in accordance with EN 12089 of Inventive Example 1, expanded polypropylene (EPP) and expanded polystyrene (EPS.

The prefoamed material was placed into storage for 10 hours and processed in a standard EPS processing machine to give round moldings. The following process parameters have proven to be practicable:

The resultant moldings were used for comparison of bending energy in accordance with EN 12089 with expanded polypropylene (EPP) and with expanded polystyrene (EPS) (Styropor, BASF SE). FIG. 3 depicts the results.

Inventive Example 2

Inventive example 1 was repeated, except that TPU component used comprised TPU minipellets with 0.5% by weight of talc powder made of Elastollan 1180A (TPU based on MDI, polyTHF 1000, polyTHF 2000 and butanediol) from BASF Polyurethanes GmbH.

Inventive Example 3

10.5 g of dicumyl peroxide (Perkadox BC-FF, AkzoNobel) were dissolved in 2.10 kg of styrene in a 5 l polyethylene canister, and 1.40 kg TPU minipellets comprising 0.5% by weight of talc powder (Elastollan 1170AU) were admixed. A shaker board was used to mix the mixture at room temperature for 30 minutes.

The mixture was then transferred to a 10 l EPS reactor [pressure autoclave (20 bar) with blade stirrer; stirrer rotation rate 300 rpm]. 3.50 kg of deionized water, 1.07 kg of MPP precipitate, and 56 g of a 2% solution of E30 emulsifier (alkanesulfonate, CAS 68188-18-1) (Leuna Tenside GmbH) were used as initial charge in the reactor. The suspension was heated to 50° C. within 30 minutes, and the temperature was maintained at 50° C. for three hours for swelling purposes. The temperature was then increased within one hour to 125° C., and 60 minutes after 125° C. had been reached 314 g of pentane-S(Haltermann/Exxon) were then metered into the mixture within 60 minutes. The temperature of 125° C. was maintained for a further 5.5 hours, and then the reactor was cooled to room temperature. The particulate polymers were worked up and processed by analogy with inventive example 1.

Inventive Example 4

Inventive example 3 was repeated, but TPU used comprised grade 1170AU minipellets with 0.5% by weight of talc powder.

Application Example 1

Expansion Performance of Materials from Inventive Examples 1 and 2

4 g of polymer from inventive example 1 or 2 was charged to injection bottles (Max Wiegand, size 75×23 mm, item No.: 4382602) sealable by rubber septum, and sealed. After a defined storage time, the ampoules were opened and the material was prefoamed in a standard Styropor prefoamer at atmospheric pressure (steam-treatment time 300 s). The bulk density of the loose material was then determined volumetrically.

| Product | Bulk density [g/L] | Pressure [bar] | Molding Number | Foam pressure max. [bar] | Demolding time [s] | Comment |
|---|---|---|---|---|---|---|
| in accordance with Inventive Example 1 60 g/L | 55.5 | 1.1 | 1 | 1.56 | 281 | 1.3/1.1 bar |
| | | | 2 | 1.55 | 277 | " |
| | | | 3 | 1.50 | 278 | " |
| | | | 4 | 1.58 | 298 | " |

| | | | | | | | |
|---|---|---|---|---|---|---|---|
| Inventive example 1 | Storage time [days] | 3 | 12 | 19 | 26 | 40 | 47 |
| | Foaming time [s] | 300 | 300 | 300 | 300 | 300 | 300 |
| | Density [g/l] | 26 | 37 | 94 | 95 | 400 | 400 |
| Inventive example 2 | Storage time [days] | 0 | 18 | 25 | 39 | 46 | 53 |
| | Foaming time [s] | 200 | 200 | 300 | 300 | 300 | 300 |
| | Density [g/l] | 26 | 51 | 40 | 58 | 63 | 64 |

The material from inventive example 2 can be prefoamed to a density of 94 g/l after 19 days of storage, while the material from inventive example 1 can be prefoamed to a density of 64 g/l even after 53 days of storage.

Application Example 2

In a procedure similar to that described for inventive example 1, 0.3% by weight of Lumogen Red was admixed with the styrene used for the swelling process. The foam obtained after processing had a red color.

Application Example 3

In a procedure similar to that described for inventive example 1, 0.3% by weight of Lumogen Green was admixed with the styrene used for the swelling process. The foam obtained after processing had a green color.

Comparative Example 1

Inventive example 1 was repeated with the following alterations. The polymerization process 1.2 used 965 g of straight TPU micropellets instead of a styrene-saturated TPU. The resultant TPU-particle material comprising blowing agent could not then be prefoamed to give expandable foam particles.

The invention claimed is:

1. An expandable-polymer-particle material comprising at least one thermoplastic polyurethane (TPU) with Vicat softening point below 80° C., in accordance with ISO 306/ASO, and 5 to 95% by weight of at least one polymer that is obtained by free-radical polymerization, the percent by weight based on the entirety of TPU and the at least one polymer, wherein the at least one polymer obtained by free radical polymerization is bonded to the TPU to provide a comb polymer, a graft polymer, or a copolymer.

2. The expandable-polymer-particle material according to claim 1, wherein the at least one polymer is a styrene polymer.

3. The expandable-polymer-particle material according to claim 2, wherein the styrene polymer is polystyrene.

4. The expandable-polymer-particle material according to claim 1, wherein the Vicat softening point is in a range of 60 to 75° C.

5. The expandable-polymer-particle material according to claim 1, wherein the TPU has a Shore hardness in a range of 50 to 150.

6. The expandable-polymer-particle material according to claim 1, wherein the TPU has a glass transition temperature in a range of −20 to −60° C.

7. The expandable-polymer-particle material according to claim 1, wherein the TPU is prepared from diphenylmethane 2,2-diisocyanate, polytetrahydrofurans, and 1,4-butenediol.

8. The expandable-polymer-particle material according to claim 7, wherein the polytetrahydrofurans are selected from polytetrahydrofuran 1000 or polytetrahydrofuran 2000.

9. A process for the production of an expandable-polymer-particle material, the process comprising the following steps:
   a) providing an aqueous dispersion comprising;
      one or more TPUs with Vicat softening point below 80° C., in accordance with ISO 306/ASO,
      5 to 95% by weight of one or more monomers that can be polymerized by free-radical polymerization, the percent by weight based on the entirety of TPU and the one or more monomers,
      a polymerization initiator, a dispersing agent, and optionally additional substances and/or polymerization aids, wherein the aqueous dispersion is at a temperature at which substantial polymerization of the one or more monomers does not occur;
   b) optional stirring the aqueous dispersion for 1 to 24 hours at a temperature at which substantial polymerization of the one or more monomers does not occur;
   c) polymerizing the one or more monomers by free-radical polymerization to provide an aqueous suspension including a comb polymer, a graft polymer, or a copolymer, in conjunction with the TPU; and
   d) adding a physical blowing agent to the aqueous suspension.

10. The process according to claim 9, wherein the free-radical polymerization is carried out in the presence of a brominated organic, a phosphorus-containing flame retardant, and/or organic peroxides.

11. The process according to claim 9, wherein the free-radical polymerization is carried out in the presence of a crosslinking agent.

12. The process according to claim 9 wherein at the temperature at which substantial polymerization of the one or more monomers does not occur, the TPU is swollen in the aqueous dispersion of the one or more monomers, the polymerization initiator, and the optional additional substances or the polymerization aids.

13. The process according to claim 12, wherein the polymerization temperature of the one or more monomers is from 110 to 140° C., and the temperature at which substantial polymerization of the one or more monomers does not occur is from 10 to 60° C.

14. The process according to claim 9, wherein the blowing agent is added to the suspension at a temperature above 100° C.

15. The process according to claim 9, wherein the aqueous suspension further comprises a Pickering stabilizer in combination with a surfactant and/or a protective colloid.

16. A foam molding obtainable from expanded-polymer-particle material according to claim 1.

17. A floorcovering, insulation material, or in shoe sole or bumper comprising a foam molding according to claim 16.

* * * * *